US011887528B2

(12) United States Patent
Lee et al.

(10) Patent No.: US 11,887,528 B2
(45) Date of Patent: Jan. 30, 2024

(54) DISPLAY DEVICE AND METHOD OF DRIVING DISPLAY DEVICE

(71) Applicant: Samsung Display Co., Ltd., Yongin-Si (KR)

(72) Inventors: Jaehoon Lee, Seoul (KR); Jung-Taek Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/079,895

(22) Filed: Dec. 13, 2022

(65) Prior Publication Data

US 2023/0186829 A1 Jun. 15, 2023

(30) Foreign Application Priority Data

Dec. 13, 2021 (KR) ........................ 10-2021-0177971

(51) Int. Cl.

| | |
|---|---|
| ***G09G 3/00*** | (2006.01) |
| ***G09G 3/20*** | (2006.01) |
| ***G09G 3/3233*** | (2016.01) |
| ***G09G 3/3266*** | (2016.01) |

(52) U.S. Cl.

CPC ......... *G09G 3/2096* (2013.01); *G09G 3/3233* (2013.01); *G09G 3/3266* (2013.01); *G09G 2300/0842* (2013.01); *G09G 2330/02* (2013.01); *G09G 2330/10* (2013.01); *G09G 2330/12* (2013.01); *G09G 2360/16* (2013.01)

(58) Field of Classification Search

CPC .......... G09G 3/20; G09G 3/3233; G09G 3/16; G09G 5/10; G09G 3/2096; G09G 3/3266; G09G 2300/0842; G09G 2330/02; G09G 2330/10; G09G 2330/12; G09G 2360/16

See application file for complete search history.

(56) References Cited

U.S. PATENT DOCUMENTS

2018/0350296 A1* 12/2018 Thompson ............ G06F 3/0673
2021/0104200 A1* 4/2021 Lee ...................... G09G 3/3607
2021/0183334 A1* 6/2021 Holland ................ G09G 5/001

FOREIGN PATENT DOCUMENTS

KR 10-2014-0041968 A 4/2014
KR 10-2015-0095987 A 8/2015
KR 10-2046565 B1 11/2019
KR 10-2020-0079085 A 7/2020

* cited by examiner

*Primary Examiner* — Michael A Faragalla
(74) *Attorney, Agent, or Firm* — Innovation Counsel LLP

(57) ABSTRACT

A display device may include a display panel including a plurality of pixel rows, a power supply providing a power voltage to the display panel, and an overcurrent protector shutting down the power supply when at least one of the pixel rows is burnt. The overcurrent protector may include a sensing controller sensing a first current of at least one first pixel row of the display panel in a first frame period, and sensing a second current of the first pixel row in a second frame period after the first frame period when the first current is greater than or equal to a first threshold value. The overcurrent protector may further include a burnt determiner determining whether the first pixel row is burnt, and providing a shutdown signal to the power supply when the first pixel row is burnt.

18 Claims, 13 Drawing Sheets

DISPLAY DEVICE AND METHOD OF DRIVING DISPLAY DEVICE

CROSS-REFERENCE TO RELATED APPLICATION(S)

This application claims priority under 35 USC § 119 to Korean Patent Application No. 10-2021-0177971 filed on Dec. 13, 2021 in the Korean Intellectual Property Office (KIPO), the entire disclosure of which is incorporated by reference herein.

BACKGROUND

1. Field

Embodiments relate to a display device. More particularly, embodiments related to a display device applied to various electronic apparatuses and a method of driving the display device.

2. Description of the Related Art

A display device may include a display panel that displays an image. The display panel may include pixels and wirings for providing signals and voltages to the pixels.

When a defect such as a short circuit between the wirings or the like occurs in the display panel, an overcurrent may occur in the display panel. When the overcurrent occurs, the pixels may be burnt.

In order to determine whether the pixels are burnt, an overcurrent of the pixels may be sensed through a power voltage line that provides a power voltage to the display panel. However, when the overcurrent is sensed through the power voltage line, the sensing of the overcurrent may be slow and inaccurate because the power voltage line is connected to a large number of pixels.

SUMMARY

Embodiments provide a display device in which whether a pixel is burnt is quickly and accurately determined.

Embodiments provide a method of driving a display device for quickly and accurately determining whether a pixel is burnt.

A display device according to an embodiment may include a display panel, a power supply, and an overcurrent protector. The display panel may include a plurality of pixel rows. The power supply may be configured to provide a power voltage to the display panel. The overcurrent protector may be configured to shut down the power supply when at least one of the pixel rows is burnt. The overcurrent protector may include a sensing controller configured to sense a first current of at least one first pixel row of the display panel in a first frame period, and configured to sense a second current of the first pixel row in a second frame period after the first frame period when the first current is greater than or equal to a first threshold value. The overcurrent protector may further include a burnt determiner configured to determine whether the first pixel row is burnt, and configured to provide a shutdown signal to the power supply when the first pixel row is burnt.

In an embodiment, the burnt determiner maybe configured to determine that the first pixel row is burnt when the second current is greater than or equal to the first threshold value.

In an embodiment, the sensing controller may be configured to sense a current of at least one predetermined pixel row of the display panel in a third frame period after the second frame period when the second current is less than the first threshold value.

In an embodiment, the sensing controller maybe configured to sense a third current of at least one second pixel row of the display panel adjacent to the first pixel row in a third frame period after the second frame period when the second current is greater than or equal to the first threshold value. The burnt determiner may be configured to determine that the first pixel row is burnt when the third current is greater than or equal to a second threshold value.

In an embodiment, when the first pixel row is an $N^{th}$ pixel row, where N is a natural number, the second pixel row may be at least one of an $(N-1)^{th}$ pixel row, an $(N+1)^{th}$ pixel row, an $(N-2)^{th}$ pixel row, and an $(N+2)^{th}$ pixel row.

In an embodiment, the second threshold value may be equal to the first threshold value.

In an embodiment, the second threshold value may be less than the first threshold value.

In an embodiment, the sensing controller may be configured to sense a current of at least one predetermined pixel row of the display panel in a fourth frame period after the third frame period when the third current is less than the second threshold value.

In an embodiment, the overcurrent protector may further include: a frame counter configured to generate a frame period number based on input image data; and a look-up table configured to store a pixel row number for a pixel row to be sensed corresponding to the frame period number.

In an embodiment, the sensing controller may be configured to sense a current of the pixel row based on the pixel row number. The burnt determiner may be configured to compare the current with a threshold value, and update the pixel row number of the look-up table when the current is greater than or equal to the threshold value.

In an embodiment, the display device may further include a scan driver configured to provide a scan signal to the display panel. The sensing controller may be configured to generate a scan start signal provided to the scan driver based on the pixel row number.

In an embodiment, the burnt determiner may be a micro controller unit.

A method of driving a display device according to an embodiment may include sensing a first current of at least one first pixel row of a display panel in a first frame period, sensing a second current of the first pixel row in a second frame period after the first frame period when the first current is greater than or equal to a first threshold value, determining whether the first pixel row is burnt, and stopping a supply of a power voltage to the display panel when the first pixel row is burnt.

In an embodiment, determining whether the first pixel row is burnt may include determining that the first pixel row is burnt when the second current is greater than the first threshold value.

In an embodiment, the method may further include: sensing a current of at least one predetermined pixel row of the display panel in a third frame period after the second frame period when the second current is less than the first threshold value.

In an embodiment, the method may further include sensing a third current of at least one second pixel row of the display panel adjacent to the first pixel row in a third frame period after the second frame period when the second current is greater than or equal to the first threshold value.

Determining whether the first pixel row is burnt may include determining that the first pixel row is burnt when the third current is greater than a second threshold value.

In an embodiment, when the first pixel row is an $N^{th}$ pixel row, where N is a natural number, the second pixel row may be at least one of an $(N-1)^{th}$ pixel row, an $(N+1)^{th}$ pixel row, an $(N-2)^{th}$ pixel row, and an $(N+2)^{th}$ pixel row.

In an embodiment, the second threshold value may be equal to the first threshold value.

In an embodiment, the second threshold value may be less than the first threshold value.

In an embodiment, the method may further include sensing a current of at least one predetermined pixel row of the display panel in a fourth frame period after the third frame period when the third current is less than the second threshold value.

In the display device and the method of driving the display device according to the embodiments, a current may be sensed for each pixel row in real-time in frame periods displaying an image, so that whether the pixel row is burnt may be quickly determined. Further, when the current of the pixel row is greater than or equal to a threshold value, currents of the same pixel row and/or adjacent pixel rows may be sensed, so that whether the pixel row is burnt may be accurately determined.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, display devices and methods of driving display devices in accordance with embodiments will be explained in detail with reference to the accompanying drawings.

Figure 1:
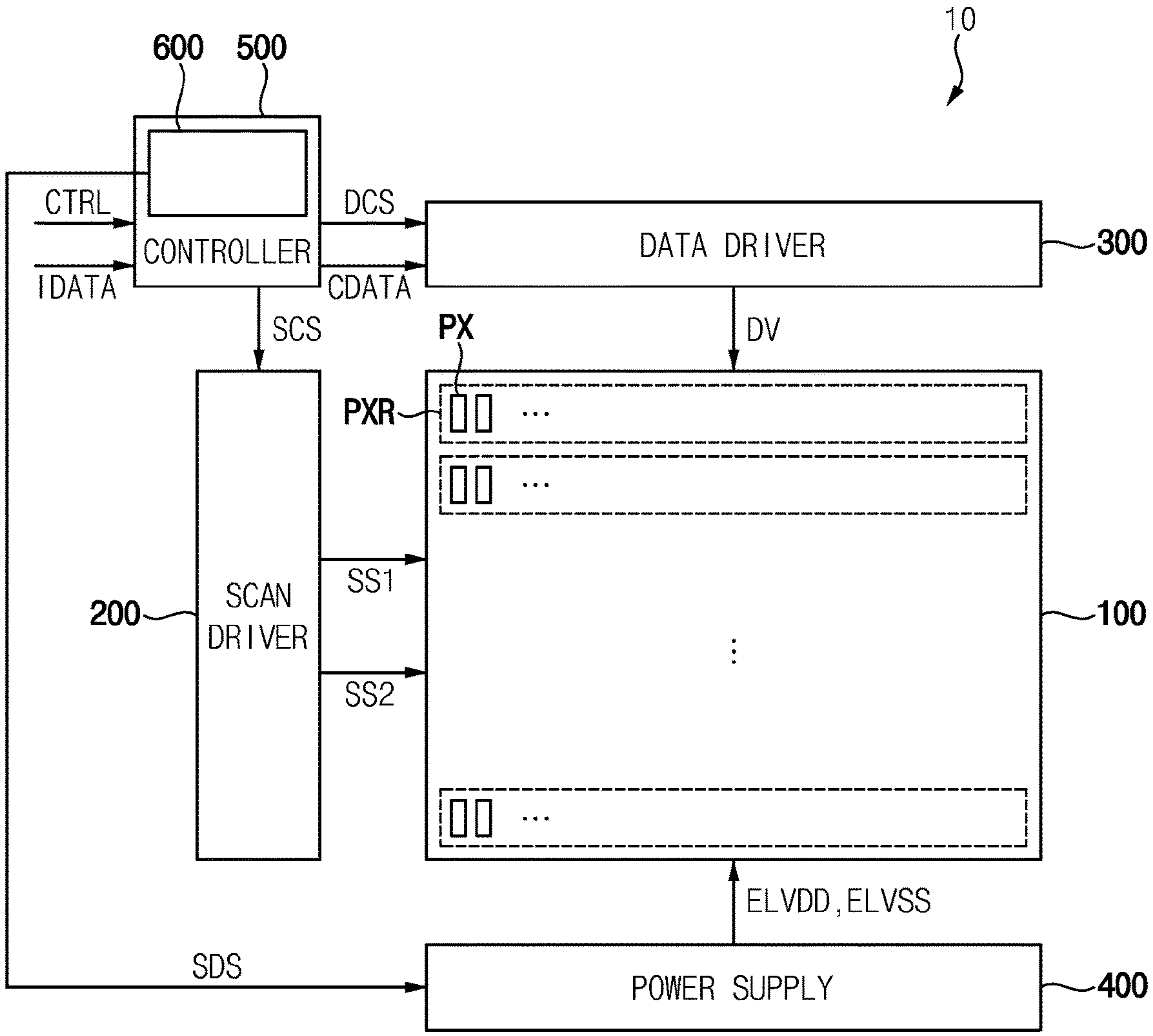
FIG. 1 is a block diagram illustrating a display device according to an embodiment.

FIG. 1 is a block diagram illustrating a display device 10 according to an embodiment.

Referring to FIG. 1, the display device 10 may include a display panel 100, a scan driver 200, a data driver 300, a power supply 400, a controller 500, and an overcurrent protector 600.

The display panel 100 may include pixels PX. The display panel 100 may receive first scan signals SS1 and second scan signals SS2 from the scan driver 200, and may receive data voltages DV from the data driver 300. Each of the pixels PX may emit light based on the first scan signal SS1, the second scan signal SS2, and the data voltage DV.

Each of the pixels PX may include a light emitting diode ("LED"). In an embodiment, each of the pixels PX may include an organic light emitting diode ("OLED"), and the display panel 100 may be an organic light emitting display panel. In an embodiment, each of the pixels PX may include an inorganic light emitting diode, a quantum dot light emitting diode, or the like.

The pixels PX may be arranged in a substantially matrix form in the display panel 100. Accordingly, a plurality of pixel rows PXR and a plurality of pixel columns may be defined in the display panel 100.

The scan driver 200 may receive a scan control signal SCS from the controller 500. The scan control signal SCS may include a scan start signal or the like. The scan driver 200 may generate the first scan signals SS1 and the second scan signals SS2 based on the scan control signal SCS. The scan driver 200 may provide the first scan signals SS1 and the second scan signals SS2 to the display panel 100.

The data driver 300 may receive a data control signal DCS and compensated image data CDATA from the controller 500. The data driver 300 may generate the data voltages DV based on the data control signal DCS and the compensated image data CDATA. The data driver 300 may provide the data voltages DV to the display panel 100.

The power supply 400 may generate a first power voltage ELVDD and a second power voltage ELVSS based on a voltage provided from the outside. In an embodiment, the first power voltage ELVDD may be greater than the second power voltage ELVSS. The power supply 400 may provide the first power voltage ELVDD and the second power voltage ELVSS to the display panel 100.

The controller 500, e.g., a timing controller "T-CON", may receive input image data IDATA and a control signal CTRL from an external host processor, e.g., a graphic processing unit ("GPU") or a graphic card. The controller 500 may generate the scan control signal SCS, the data control signal DCS, and the compensated image data CDATA based on the input image data IDATA and the control signal CTRL. In an embodiment, the controller 500 may generate the compensated image data CDATA from the input image data IDATA by compensating threshold voltages and/or mobilities of driving transistors of the pixels PX. The controller 500 may provide the scan control signal SCS to the scan driver 200, and may provide the data control signal DCS and the compensated image data CDATA to the data driver 300.

The overcurrent protector 600 may sense currents of the pixel rows PXR in frame periods. Specifically, the overcurrent protector 600 may sense the currents of the pixel rows PXR in a predetermined sensing order in vertical blank periods of the frame periods. The vertical blank period may be a period in which all pixels PX do not display an image among the frame period.

The overcurrent protector 600 may compare the sensed currents with threshold values to determine whether the pixel rows PXR are burnt. Specifically, when a current of a first pixel row sensed in a vertical blank period of a first frame period is equal to or greater than a first threshold value, the overcurrent protector 600 may sense a current of the first pixel row again instead of another pixel row according to the predetermined sensing order in a vertical blank period of a second frame period after the first frame period. The first threshold value may be a predetermined value. The second frame period may include at least one frame period, and the current of the first pixel row may be sensed again at least once.

In an embodiment, when the re-sensed current of the first pixel row is equal to or greater than the first threshold value, the overcurrent protector 600 may determine that the first pixel row is burnt. When the re-sensed current of the first pixel row is less than the first threshold value, the overcurrent protector 600 may determine that the first pixel row is not burnt, and may sense currents of pixel rows according to the predetermined sensing order in vertical blank periods of frame periods after the second frame period.

In an embodiment, when the re-sensed current of the first pixel row is equal to or greater than the first threshold value, the overcurrent protector 600 may sense a current of a second pixel row adjacent to the first pixel row in a vertical blank period of a third frame period after the second frame period. The third frame period may include at least one frame period, and the second pixel row may include at least one of pixel rows adjacent to the first pixel row.

When the sensed current of the second pixel row is equal to or greater than a second threshold value, the overcurrent protector 600 may determine that the first pixel row is burnt. The second threshold value may be a predetermined value, and may be equal to or less than the first threshold value. When the sensed current of the second pixel row is less than the second threshold value, the overcurrent protector 600 may determine that the first pixel row is not burnt, and may sense currents of pixel rows according to the predetermined sensing order in vertical blank periods of frame periods after the third frame period.

When at least one of the pixel rows PXR is burnt, the overcurrent protector 600 may shut down the power supply 400. In order to shut down the power supply 400, the overcurrent protector 600 may provide a shutdown signal SDS to the power supply 400. The power supply 400 may be shut down based on the shutdown signal SDS. When the power supply 400 is shut down, the power supply 400 may not provide the first power voltage ELVDD and the second power voltage ELVSS to the display panel 100.

In an embodiment, the overcurrent protector 600 may be included in the controller 500 as illustrated in FIG. 1. However, in an embodiment, the overcurrent protector 600 may be configured separately from the controller 500.

In the display device according to the embodiments of the present disclosure, a current for each pixel row PXR may be sensed in the vertical blank periods of the frame periods, so that whether the pixel row PXR is burnt may be quickly determined. Further, when the current of the pixel row PXR is equal to or greater than a threshold value, currents of the same pixel row PXR and/or adjacent pixel row PXR may be sensed, so that whether the pixel row PXR is burnt may be accurately determined.

Embodiments in which current of one pixel row is sensed for each frame period are described above. However, in an embodiment, the overcurrent protector 600 may sense currents of a plurality of pixel rows PXR in one frame period. Specifically, when the sum of currents of M first pixel rows sensed in the vertical blank period of the first frame period is equal to or greater than the product of the first threshold value and, where M is a natural number greater than or equal to 2, the overcurrent protector 600 may sense currents of the first pixel rows again in a vertical blank period of a second frame period after the first frame period.

In an embodiment, when the sum of the re-sensed currents of the first pixel rows is equal to or greater than the product of the first threshold value and M, the overcurrent protector 600 may determine that at least one of the first pixel rows is burnt.

In an embodiment, when the sum of the re-sensed currents of the first pixel rows is equal to or greater than the product of the first threshold value and, the overcurrent protector 600 may sense currents of M second pixel rows adjacent to the first pixel rows in a vertical blank period of a third frame period after the second frame period.

When the sum of the sensed currents of the second pixel rows is equal to or greater than the product of a second threshold value and M, the overcurrent protector 600 may determine that at least one of the first pixel rows is burnt.

Figure 2:
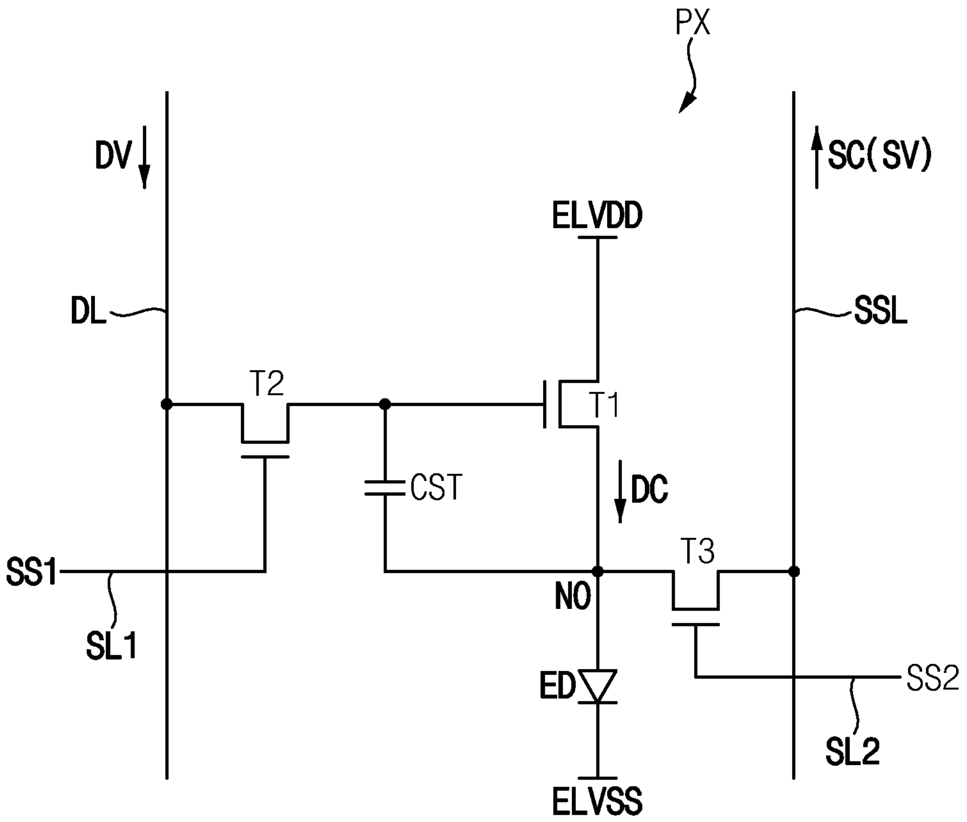
FIG. 2 is a circuit diagram illustrating a pixel included in the display device of FIG. 1.

FIG. 2 is a circuit diagram illustrating the pixel PX included in the display device 10 of FIG. 1.

Referring to FIGS. 1 and 2, the pixel PX may be connected to a first scan line SL1, a second scan line SL2, a data line DL, and a sensing line SSL. The pixel PX may include a driving transistor T1, a switching transistor T2, a sensing transistor T3, a storage capacitor CST, and a light emitting diode ED.

The switching transistor T2 may transmit the data voltage DV transmitted from the data line DL in response to the first scan signal SS1 transmitted from the first scan line SL1.

The driving transistor T1 may generate a driving current DC flowing from a line transmitting the first power voltage ELVDD to a line transmitting the second power voltage ELVSS based on the data voltage DV.

The storage capacitor CST may store the data voltage DV.

The light emitting diode ED may emit light based on the driving current DC.

The sensing transistor T3 may transmit a sensing current SC or a sensing voltage SV to the sensing line SSL in response to the second scan signal SS2 transmitted from the second scan line SL2. The sensing voltage SV may be a voltage at a node NO between the driving transistor T1 and the light emitting diode ED, and the sensing current SC may be a current flowing through the sensing transistor T3.

The overcurrent protector 600 may sense the current of the pixel rows PXR of the display panel 100 in the vertical blank periods of the frame periods based on sensing currents SC generated in the pixels PX included in the pixel row PXR.

Figure 3:
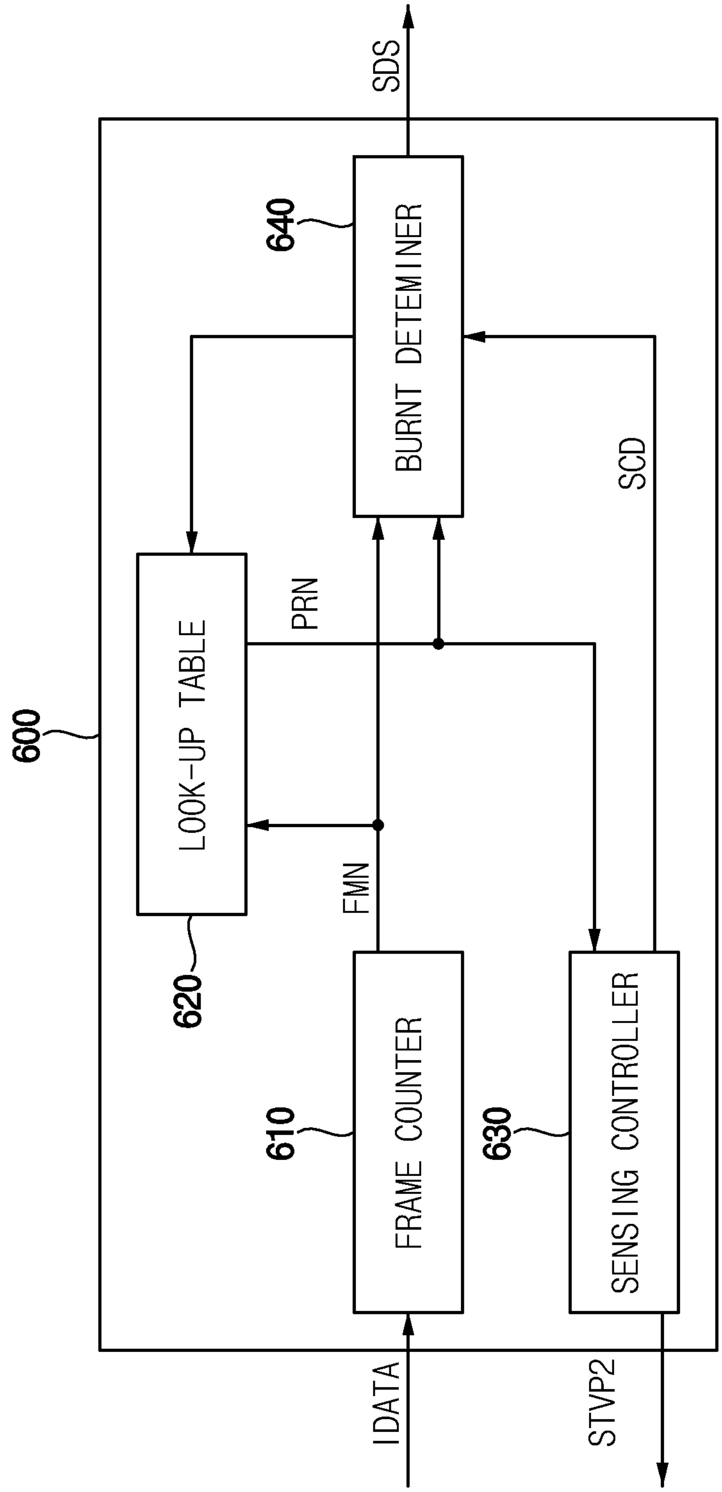
FIG. 3 is a block diagram illustrating an overcurrent protector included in the display device of FIG. 1.

FIG. 3 is a block diagram illustrating the overcurrent protector 600 included in the display device 10 of FIG. 1.

Referring to FIGS. 1, 2, and 3, the overcurrent protector 600 may include a frame counter 610, a look-up table 620, a sensing controller 630, and a burnt determiner 640.

The frame counter 610 may generate a frame period number FMN based on the input image data IDATA. The frame counter 610 may generate the frame period number FMN by counting the number of frames included in the input image data IDATA. The frame counter 610 may provide the frame period number FMN to the look-up table 620 and the burnt determiner 640.

The look-up table 620 may store information on the pixel row PXR to be sensed corresponding to the frame period. The look-up table 620 may store a pixel row number PRN for a pixel row PXR to be sensed corresponding to the frame period number FMN. The look-up table 620 may provide the pixel row number PRN to the sensing controller 630 and the burnt determiner 640.

The sensing controller 630 may sense a current of the pixel row PXR based on the pixel row number PRN. The sensing controller 630 may provide sensing current data SCD for the current in the pixel row PXR to the burnt determiner 640.

The sensing controller 630 may generate a scan start signal STVP2 based on the pixel row number PRN to sense the current of the pixel row PXR corresponding to the pixel row number PRN. The sensing controller 630 may provide the scan start signal STVP2 to the scan driver 200. The scan driver 200 may generate the first scan signal SS1 and the second scan signal SS2 based on the scan start signal STVP2. The switching transistor T2 and the sensing transistor T3 of the pixel PX included in the pixel row PXR may be turned on based on the first scan signal SS1 and the second scan signal SS2 in the vertical blank period. Accordingly, the sensing current SC may be generated in the pixel PX included in the pixel row PXR, and the sensing controller 630 may sense the current of the pixel row PXR.

The burnt determiner 640 may compare the current of the pixel row PXR with a threshold value to determine whether the pixel row PXR is burnt. When the current of the pixel row PXR is equal to or greater than the threshold value, the burnt determiner 640 may update the pixel row number PRN of the look-up table 620 based on the frame period number FMN provided from the frame counter 610 and the pixel row number PRN provided from the look-up table 620. Specifically, the burnt determiner 640 may update the pixel row number PRN of the look-up table 620 such that the sensing controller 630 may sense a current of the same pixel row PXR again in a next frame period.

When the current of the pixel row PXR is less than the threshold value, the burnt determiner 640 may not update the pixel row number PRN of the look-up table 620. In this case, the sensing controller 630 may sense a current of another pixel row PXR based on the pixel row number PRN stored in the look-up table 620 in a next frame period.

The burnt determiner 640 may provide the shutdown signal SDS to the power supply 400 when the pixel row PXR is burnt. Accordingly, the power supply 400 may be shut down, and the power supply 400 may not provide the power voltages ELVDD and ELVSS to the display panel 100.

In an embodiment, the burnt determiner 640 may be a micro controller unit ("MCU").

Figure 4:
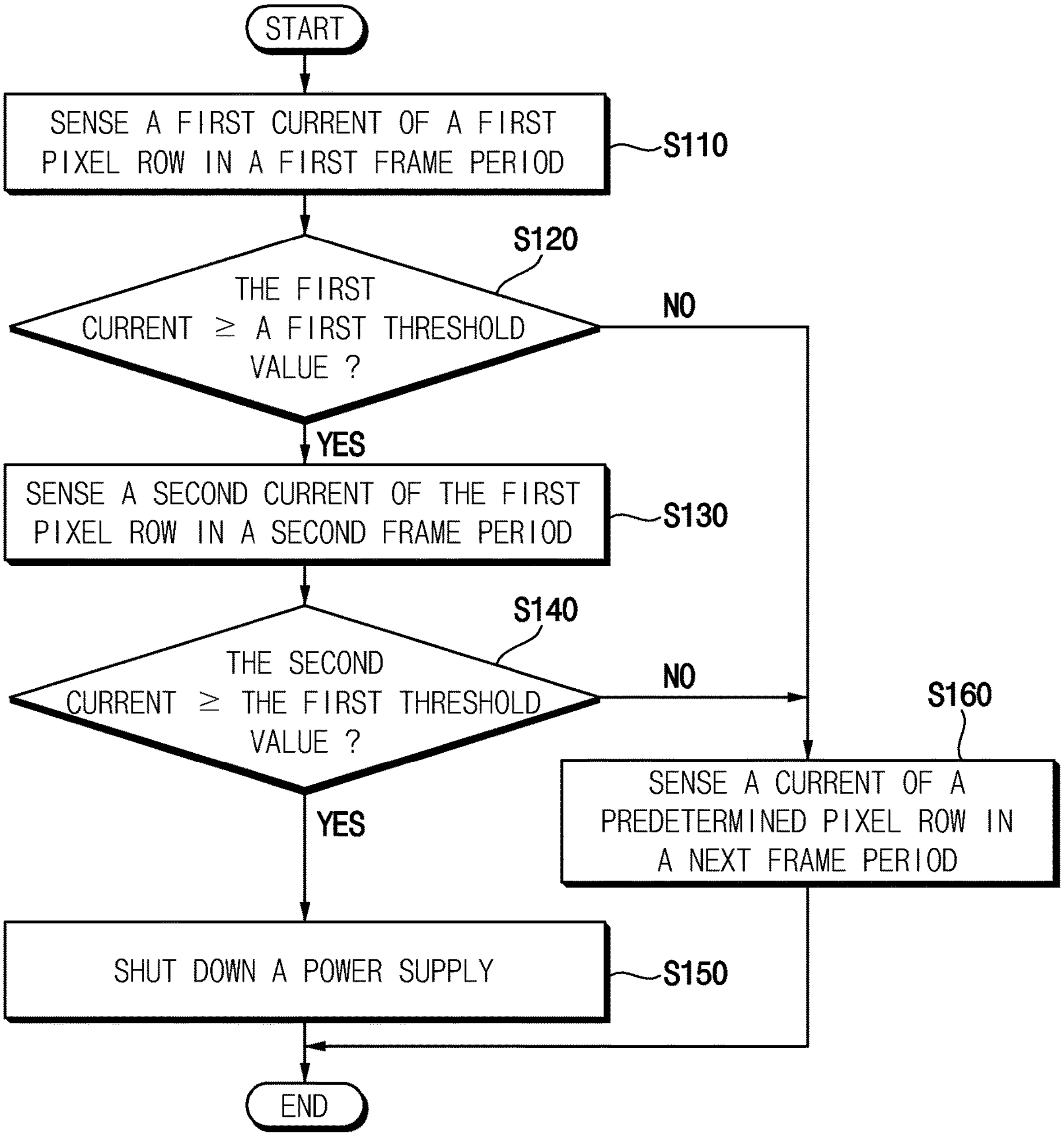
FIG. 4 is a flowchart illustrating a method of driving a display device according to an embodiment.
Figure 5:
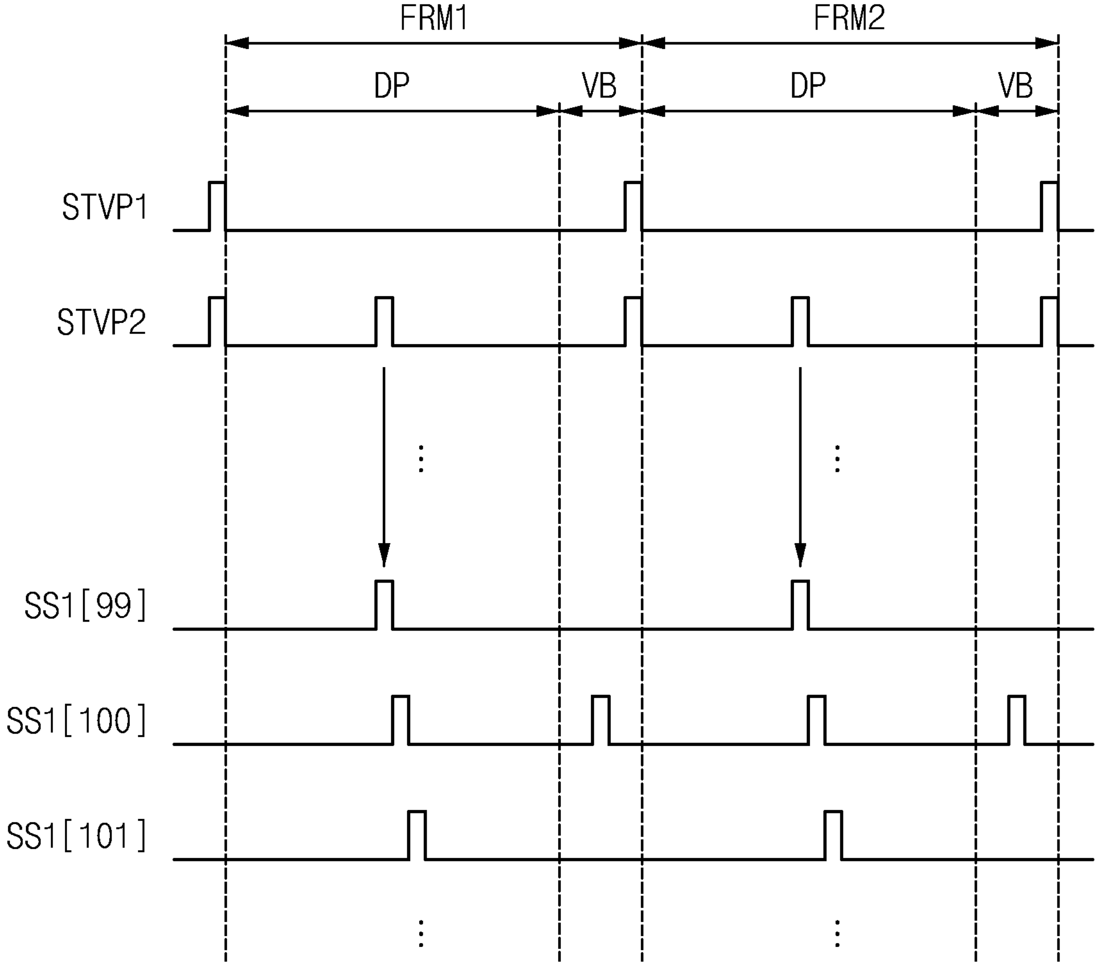
FIG. 5 is a diagram for describing frame periods according to an embodiment.
Figure 6:
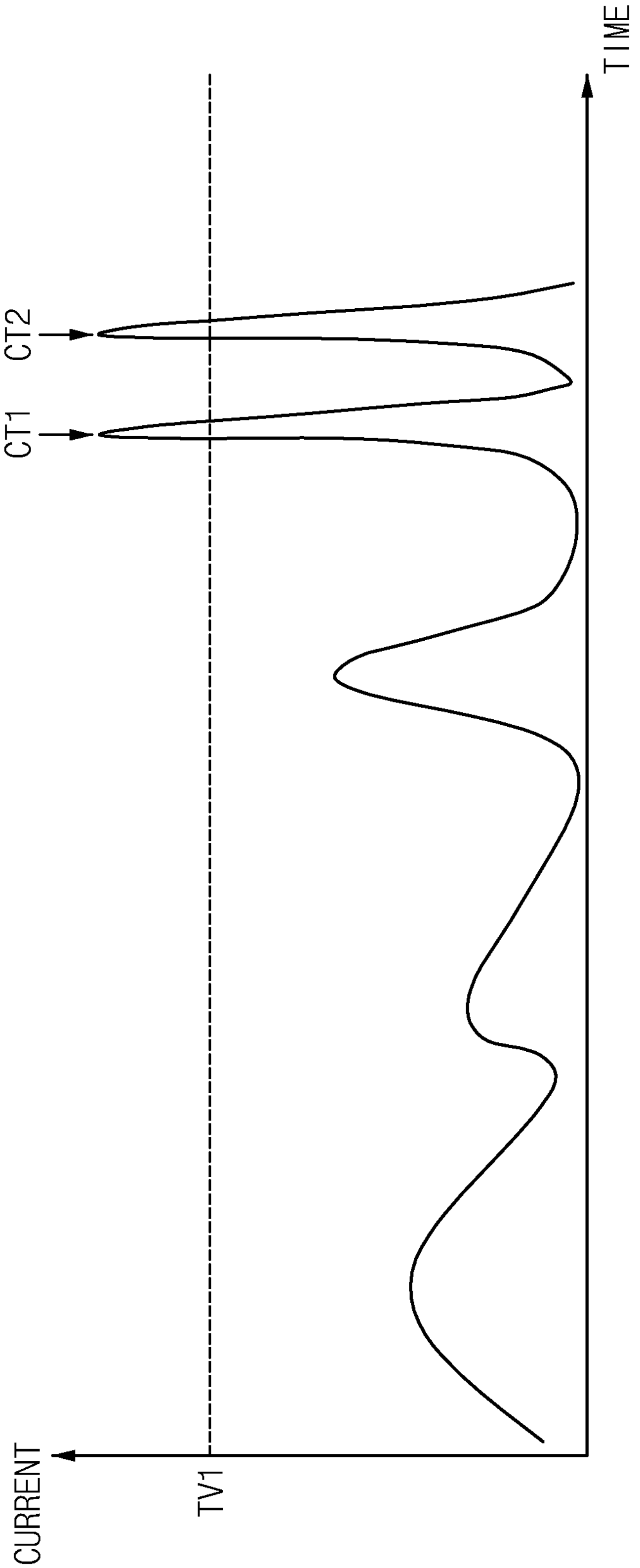
FIG. 6 is a diagram for describing currents of pixel rows according to an embodiment.

FIG. 4 is a flowchart illustrating a method of driving a display device 10 according to an embodiment. FIG. 5 is a diagram for describing frame periods FRM1 and FRM2 according to an embodiment. FIG. 6 is a diagram for describing currents of pixel rows according to an embodiment.

Referring to FIGS. 1, 2, 3, 4, 5, and 6, the sensing controller 630 of the overcurrent protector 600 may sense a first current CT1 of a first pixel row in a vertical blank period VB of a first frame period FRM1 in an operation S110. Hereinafter, an example in which the first pixel row is a $100^{th}$ pixel row PXR will be described.

The sensing controller 630 may generate a second scan start signal STVP2 provided to the scan driver 200 based on the pixel row number PRN provided from the look-up table 620 of the overcurrent protector 600. The scan driver 200 may generate the first scan signals SS1 and the second scan signals SS2 based on a first scan start signal STVP1 and the second scan start signal STVP2. For example, when the pixel row number PRN is 100, the second scan start signal STVP2 may have a gate-on voltage of which timing is the same as that of a first scan signal SS1 [99] for a $99^{th}$ pixel row in an image display period DP of the first frame period FRM1. The second scan start signal STVP2 may be applied as an input signal to a stage of the scan driver 200 which outputs a first scan signal SS1 [100] for the $100^{th}$ pixel row PXR that is a next pixel row of the $99^{th}$ pixel row PXR. In this case, the stage outputting the first scan signal SS1 [100] for the $100^{th}$ pixel row PXR may store the second scan start signal STVP2, and then may output the second scan start signal STVP2 in the vertical blank period VB. Accordingly, the first scan signal SS1 [100] for the $100^{th}$ pixel row PXR may have a gate-on voltage in the vertical blank period VB of the first frame period FRM1. Accordingly, the sensing controller 630 may sense the first current CT1 of the first pixel row in the vertical blank period VB of the first frame period FRM1.

The sensing controller 630 may generate sensing current data SCD for the first current CT1 of the first pixel row corresponding to the pixel row number PRN. For example, the sensing current data SCD may include a value corresponding to the first current CT1 of the $100^{th}$ pixel row PXR.

The burnt determiner 640 of the overcurrent protector 600 may compare the first current CT1 of the first pixel row with a first threshold value TV1 in an operation S120. The first threshold value TV1 may be a predetermined value.

When the first current CT1 of the first pixel row is equal to or greater than the first threshold value TV1, the sensing controller 630 may sense a second current CT2 of the first pixel row in a vertical blank period VB of a second frame period FRM2 after the first frame period FRM1 in an operation S130. The second frame period FRM2 may include at least one frame period, and the second current CT2 of the first pixel row may be sensed at least once.

The burnt determiner 640 may update the pixel row number PRN of the look-up table 620 such that the sensing controller 630 may sense the second current CT2 of the first pixel row in the vertical blank period VB of the second frame period FRM2. Accordingly, the sensing controller 630 may sense the second current CT2 of the first pixel row instead of a current of a predetermined pixel row in the vertical blank period VB of the second frame period FRM2.

When the first current CT1 of the first pixel row is less than the first threshold value TV1, the sensing controller 630 may sense the current of the predetermined pixel row in the vertical blank period VB of the second frame period FRM2 in an operation S160.

The burnt determiner 640 may determine whether the first pixel row is burnt based on the second current CT2 of the first pixel row. The burnt determiner 640 may compare the second current CT2 of the first pixel row with the first threshold value TV1 to determine whether the first pixel row is burnt in an operation S140.

When the second current CT2 of the first pixel row is equal to or greater than the first threshold value TV1, the burnt determiner 640 may determine that the first pixel row is burnt. Accordingly, when the second current CT2 of the first pixel row is equal to or greater than the first threshold value TV1, the burnt determiner 640 may shut down the power supply 400 to minimize a damage of the display device 10 due to the first pixel row being burnt in an operation S150. The burnt determiner 640 may provide the shutdown signal SDS to the power supply 400, and the power supply 400 may not provide the power voltages ELVDD and EVLSS to the display panel 100 based on the shutdown signal SDS.

When the second current CT2 of the first pixel row is less than the first threshold value TV1, the burnt determiner 640 may determine that the first pixel row is not burnt. Accordingly, the sensing controller 630 may sense a current of a predetermined pixel row in a vertical blank period of a frame period after the second frame period FRM2 in the operation S160.

While an overcurrent due to noise may occur temporarily, an overcurrent due to burnt may occur continuously. In the present embodiment, since the overcurrent protector 600 senses the current of the pixel row PXR twice or more to determine whether the pixel row PXR is burnt, the overcurrent caused by burnt and the overcurrent caused by noise may be distinguished. Accordingly, the overcurrent protector 600 may accurately determine whether the pixel row PXR is burnt. Further, since the current of the pixel row PXR is sensed twice or more using relatively few frame periods, the overcurrent protector 600 may quickly determine whether the pixel row PXR is burnt.

Figure 7:
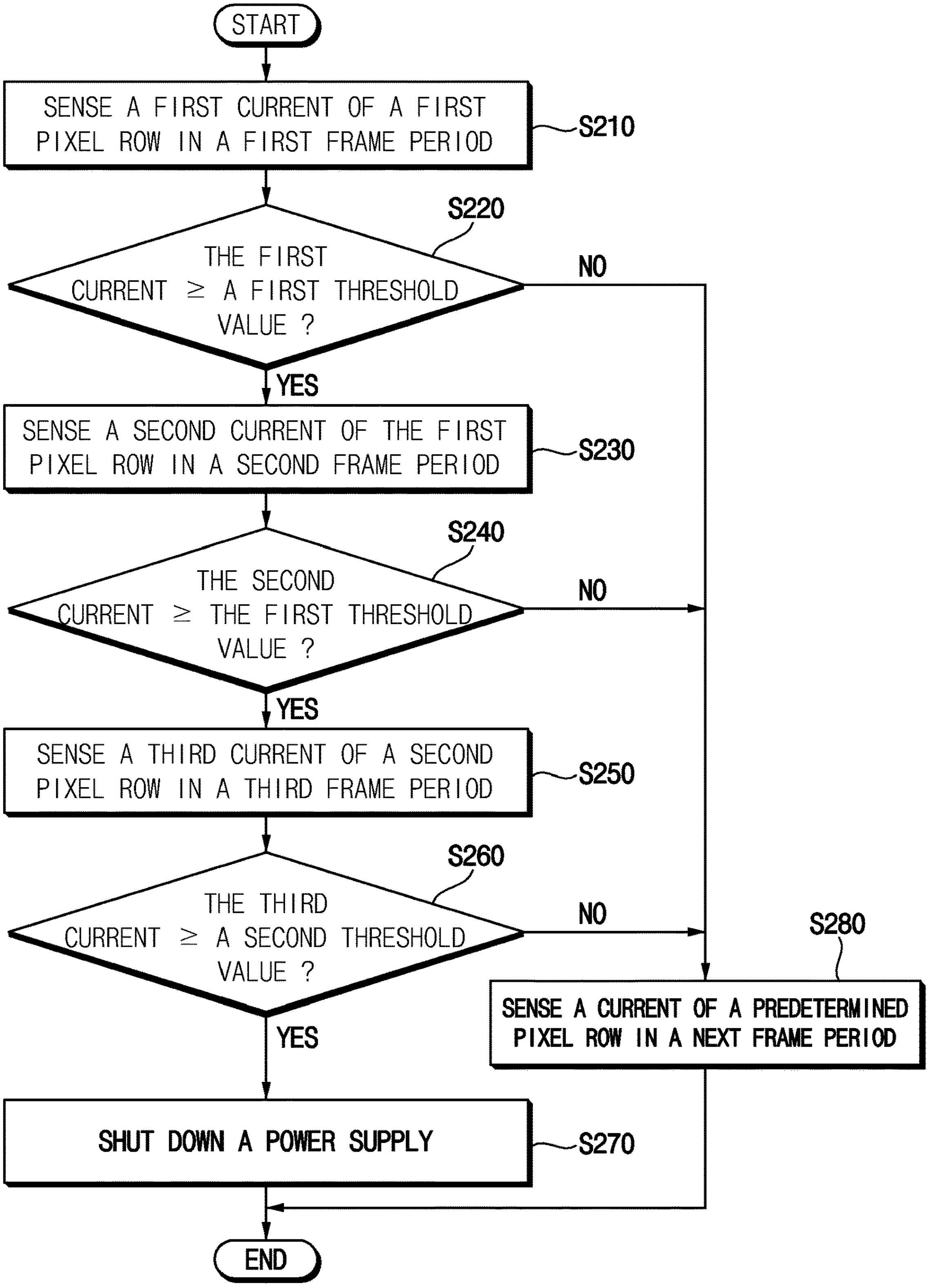
FIG. 7 is a flowchart illustrating a method of driving a display device according to an embodiment.
Figure 8:
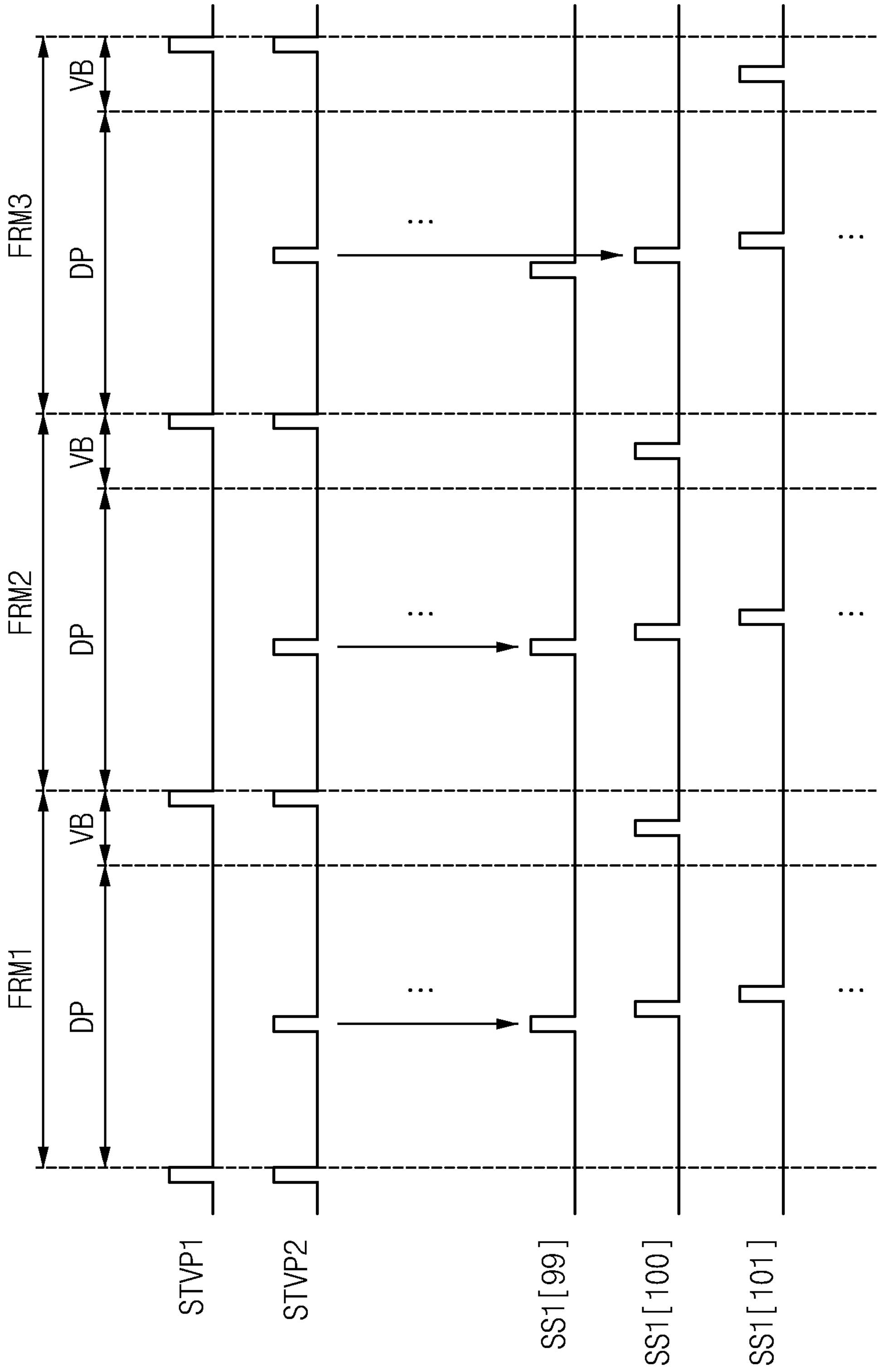
FIG. 8 is a diagram for describing frame periods according to an embodiment.
Figure 9:
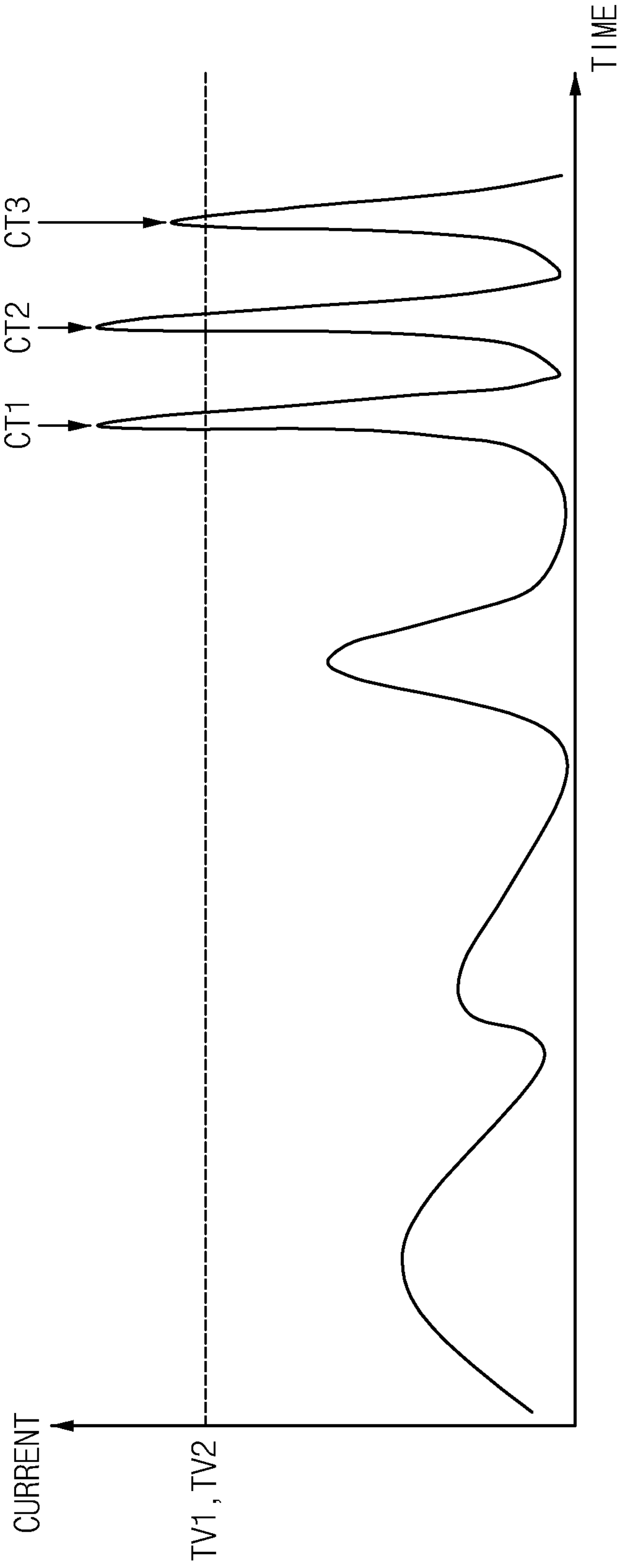
FIGS. 9 and 10 are diagrams for describing currents of pixel rows according to an embodiment.
Figure 10:
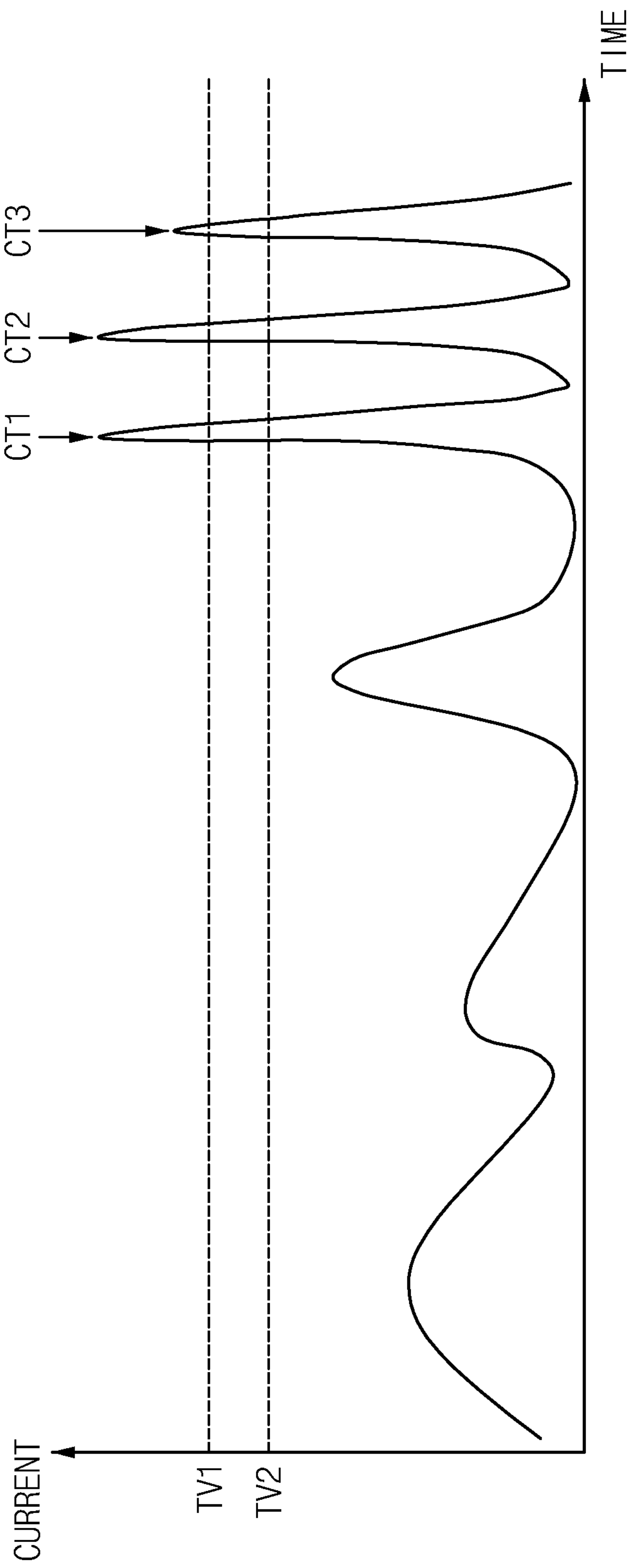

FIG. 7 is a flowchart illustrating a method of driving a display device 10 according to an embodiment. FIG. 8 is a diagram for describing frame periods FRM1, FRM2, and FRM3 according to an embodiment. FIGS. 9 and 10 are diagrams for describing currents of pixel rows according to an embodiment.

Referring to FIGS. 1, 2, 3, 7, 8, 9, and 10, the sensing controller 630 of the overcurrent protector 600 may sense a first current CT1 of a first pixel row in a vertical blank period VB of a first frame period FRM1 in an operation S210.

The burnt determiner 640 of the overcurrent protector 600 may compare the first current CT1 of the first pixel row with a first threshold value TV1 in an operation S220.

When the first current CT1 of the first pixel row is equal to or greater than the first threshold value TV1, the sensing controller 630 may sense a second current CT2 of the first pixel row in a vertical blank period VB of a second frame period FRM2 after the first frame period FRM1 in an operation S230. The sensing controller 630 may sense the second current CT2 of the first pixel row instead of a current of a predetermined pixel row in the vertical blank period VB of the second frame period FRM2.

When the first current CT1 of the first pixel row is less than the first threshold value TV1, the sensing controller 630 may sense the current of the predetermined pixel row in the vertical blank period VB of the second frame period FRM2 in an operation S280.

The burnt determiner 640 may compare the second current CT2 with the first threshold value TV1 in an operation S240.

When the second current CT2 of the first pixel row is equal to or greater than the first threshold value TV1, the sensing controller 630 may sense a third current CT3 of a second pixel row adjacent to the first pixel row in a vertical blank period VB of a third frame period FRM3 after the second frame period FRM2 in an operation S250. The third frame period FRM3 may include at least one frame period, and the third current CT3 of the second pixel row may be sensed at least once.

In an embodiment, when the first pixel row is an $N^{th}$ pixel row PXR, where N is a natural number, the second pixel row may be one of an $(N-1)^{th}$ pixel row PXR and an $(N+1)^{th}$ pixel row PXR. For example, when the first pixel row is the $100^{th}$ pixel row PXR, the second pixel row may be one of the $99^{th}$ pixel row PXR and the $101^{st}$ pixel row PXR. However, in an embodiment, when the first pixel row is the $N^{th}$ pixel row PXR, the second pixel row may be one of the $(N-1)^{th}$ pixel row PXR, the $(N+1)^{th}$ pixel row PXR, an $(N-2)^{th}$ pixel row PXR, and an $(N+2)^{th}$ pixel row PXR. Hereinafter, an example in which the second pixel row is the $101^{st}$ pixel row PXR will be described.

The burnt determiner 640 may update the pixel row number PRN of the look-up table 620 such that the sensing controller 630 may sense the third current CT3 of the second pixel row in the vertical blank period VB of the third frame period FRM3. Accordingly, the sensing controller 630 may sense the third current CT3 of the second pixel row instead of a current of a predetermined pixel row in the vertical blank period VB of the third frame period FRM3. For example, when the pixel row number PRN is 101, the second scan start signal STVP2 may have a gate-on voltage of which timing is the same as that of a first scan signal SS1 [100] for the $100^{th}$ pixel row in an image display period DP of the third frame period FRM3. Accordingly, the first scan signal SS1 [101] for the $101^{st}$ pixel row PXR may have a gate-on voltage in the vertical blank period VB of the third frame period FRM3. Accordingly, the sensing controller 630 may sense the third current CT3 of the second pixel row in the vertical blank period VB of the third frame period FRM3.

When the second current CT2 of the first pixel row is less than the first threshold value TV1, the burnt determiner 640 may determine that the first pixel row is not burnt. Accordingly, the sensing controller 630 may sense the current of the predetermined pixel row in the vertical blank period VB of the third frame period FRM3 in the operation S280.

The burnt determiner 640 may determine whether the first pixel row is burnt based on the third current CT3 of the second pixel row. The burnt determiner 640 may compare the third current CT3 of the second pixel row with a second threshold value TV2 to determine whether the first pixel row is burnt in an operation S260.

In an embodiment, as illustrated in FIG. 9, the second threshold value TV2 may be equal to the first threshold value TV1. According to such an embodiment, whether the first pixel row is burnt may be strictly determined, and accordingly, determining that the first pixel row is burnt by an overcurrent of the second pixel row due to noise may be prevented.

In an embodiment, as illustrated in FIG. 10, the second threshold value TV2 may be less than the first threshold value TV1. When the first pixel row is burnt, the degree of burnt of the second pixel row may be less than the degree of burnt of the first pixel row. According to such an embodiment, in determining whether the first pixel row is burnt, a difference between the degree of burnt of the first pixel row and the degree of burnt of the second pixel row may be considered. Accordingly, determining that the first pixel row is not burnt despite an overcurrent of the second pixel row due to burnt may be prevented.

When the third current CT3 of the second pixel row is equal to or greater than the second threshold value TV2, the burnt determiner 640 may determine that the first pixel row is burnt. Accordingly, when the third current CT3 of the second pixel row is equal to or greater than the second threshold value TV2, the burnt determiner 640 may shut down the power supply 400 to minimize a damage of the display device 10 due to the first pixel row being burnt in an operation S270.

When the third current CT3 of the second pixel row is less than the second threshold value TV2, the burnt determiner 640 may determine that the first pixel row is not burnt. Accordingly, the sensing controller 630 may sense a current of a predetermined pixel row in a vertical blank period of a frame period after the third frame period FRM3 in the operation S280.

An overcurrent due to noise may occur only in one pixel row, whereas an overcurrent due to burnt may occur in the pixel row and pixel rows adjacent to the pixel row. In the present embodiment, since the overcurrent protector 600 senses the current of the pixel row PXR and the current of the adjacent pixel row to determine whether the pixel row PXR is burnt, the overcurrent due to noise and the overcurrent due to burnt may be distinguished. Accordingly, the overcurrent protector 600 may accurately determine whether the pixel row PXR is burnt. Further, since the current of the pixel row PXR is sensed twice or more and the current of the adjacent pixel row is sensed using relatively few frame periods, the overcurrent protector 600 may quickly determine whether the pixel row PXR is burnt.

Figure 11:
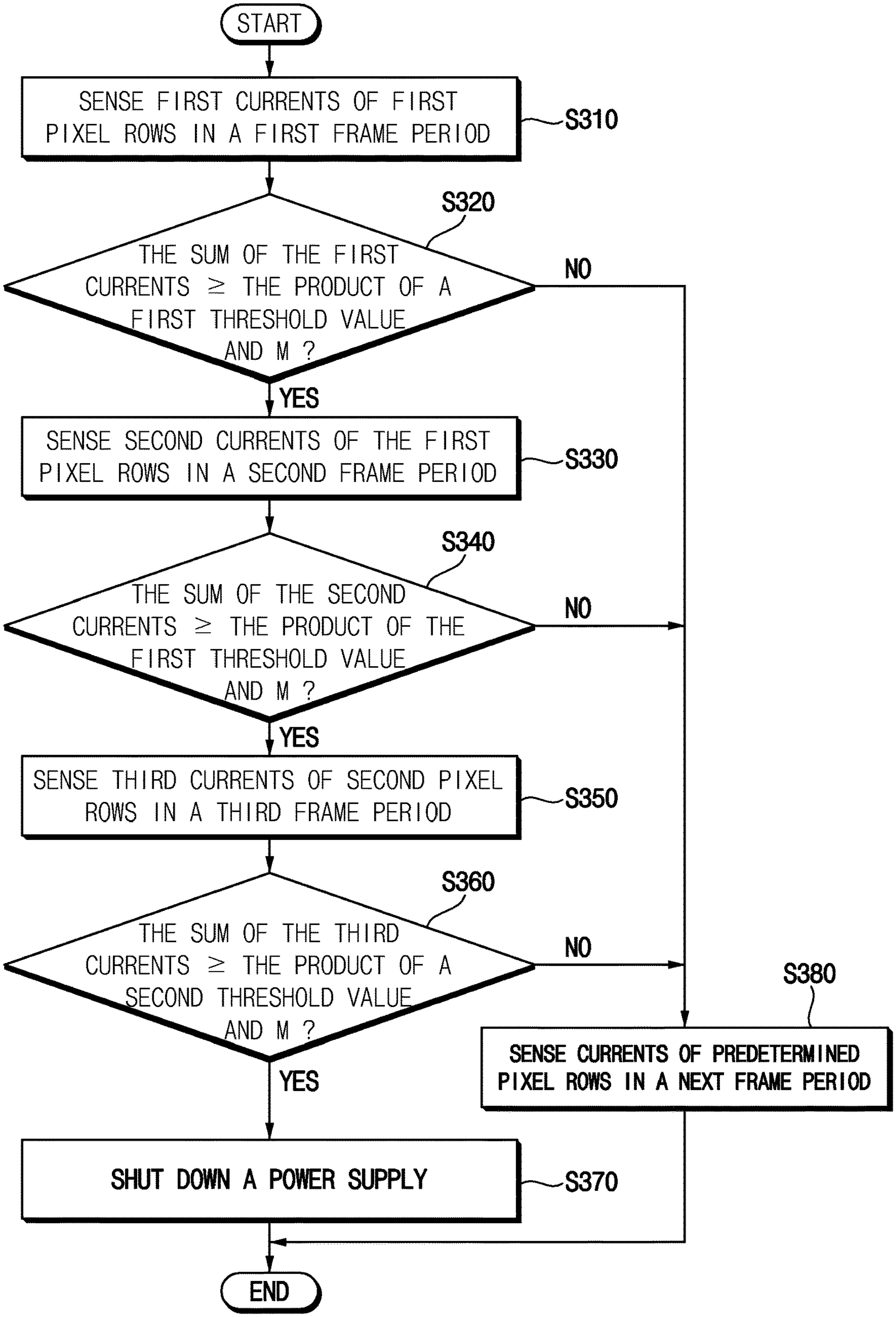
FIG. 11 is a flowchart illustrating a method of driving a display device according to an embodiment.
Figure 12:
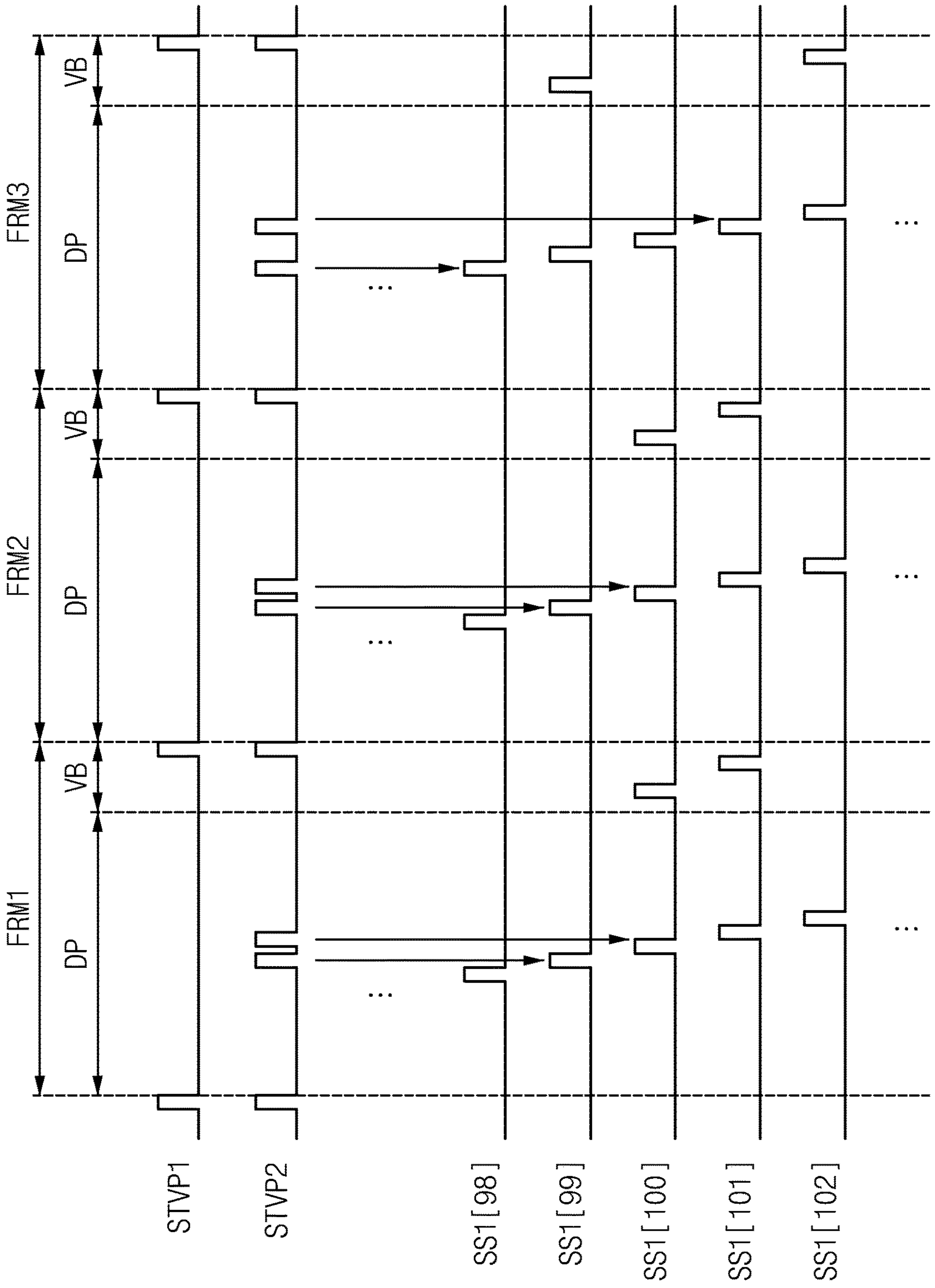
FIG. 12 is a diagram for describing frame periods according to an embodiment.

FIG. 11 is a flowchart illustrating a method of driving a display device 10 according to an embodiment. FIG. 12 is a diagram for describing frame periods FRM1, FRM2, and FRM3 according to an embodiment.

Referring to FIGS. 1, 2, 3, 11, and 12 the sensing controller 630 of the overcurrent protector 600 may sense first currents CT1 of M first pixel rows in a vertical blank period VB of a first frame period FRM1 in an operation S310.

The burnt determiner 640 of the overcurrent protector 600 may compare the sum of the first currents of the first pixel rows with the product of a first threshold value and M in an operation S320.

When the sum of the first currents in the first pixel rows is equal to or greater than the product of the first threshold value and M, the sensing controller 630 may sense second currents of the first pixel rows in a vertical blank period VB of a second frame period FRM2 after the first frame period FRM1 in an operation S330. The sensing controller 630 may sense the second currents of the first pixel rows instead of currents of predetermined pixel rows in the vertical blank period VB of the second frame period FRM2.

When the sum of the first currents of the first pixel rows is less than the product of the first threshold value and M, the sensing controller 630 may sense the currents of the predetermined pixel rows in the vertical blank period VB of the second frame period FRM2 in an operation S380.

The burnt determiner 640 may compare the sum of the second currents of the first pixel rows with the product of the first threshold value and M in an operation S340.

When the sum of the second currents of the first pixel rows is equal to or greater than the product of the first threshold value and M, the sensing controller 630 may sense third currents CT3 of second pixel rows adjacent to the first pixel rows in a vertical blank period VB of a third frame period FRM3 after the second frame period FRM2 in an operation S350. The third frame period FRM3 may include at least one frame period, and the third currents CT3 of the second pixel rows may be sensed at least once.

In an embodiment, when the first pixel rows are an $N^{th}$ pixel row PXR and an $(N+1)^{th}$ pixel row PXR, where N is a natural number, the second pixel rows may bean $(N-1)^{th}$ pixel row PXR and an $(N+2)^{th}$ pixel row PXR. For example, when the first pixel rows are a $100^{th}$ pixel row PXR and a $101^{st}$ pixel row PXR, the second pixel rows may be a $99^{th}$ pixel row PXR and a $102^{nd}$ pixel row PXR. However, in an embodiment, when the first pixel rows are the $N^{th}$ pixel row PXR and the $(N+1)^{th}$ pixel row PXR, the second pixel rows may be two of the $(N-1)^{th}$ pixel row PXR, the $(N+2)^{th}$ pixel row PXR, an $(N-2)^{th}$ pixel row PXR, and an $(N+3)^{th}$ pixel row PXR. Hereinafter, an example in which the second pixel rows are the $99^{th}$ pixel row PXR and the $102^{nd}$ pixel row PXR will be described.

The burnt determiner 640 may update the pixel row numbers PRN of the look-up table 620 such that the sensing controller 630 may sense the third currents of the second pixel rows in the vertical blank period VB of the third frame period FRM3. Accordingly, the sensing controller 630 may sense the third currents of the second pixel rows instead of currents of predetermined pixel rows in the vertical blank period VB of the third frame period FRM3. For example, when the pixel row numbers PRN are 99 and 102, the second scan start signal STVP2 may have a gate-on voltage of which timing is the same as those of a first scan signal SS1 [98] for the $98^{th}$ pixel row and a first scan signal SS1 [101] for the $101^{st}$ pixel row in an image display period DP of the third frame period FRM3. Accordingly, the first scan signal SS1 [99] for the $99^{th}$ pixel row PXR, which is a next pixel row of the $98^{th}$ pixel row PXR, and the first scan signal SS1 [102] for the $102^{nd}$ pixel row PXR, which is a next pixel row of the $101^{st}$ pixel row PXR, may have a gate-on voltage in the vertical blank period VB of the third frame period FRM3. Accordingly, the sensing controller 630 may sense the third currents of the second pixel rows in the vertical blank period VB of the third frame period FRM3.

When the sum of the second currents of the first pixel rows is less than the product of the first threshold value and M, the burnt determiner 640 may determine that the first pixel rows are not burnt. Accordingly, the sensing controller 630 may sense the currents of the predetermined pixel rows in the vertical blank period VB of the third frame period FRM3 in the operation S380.

The burnt determiner 640 may determine whether the first pixel rows are burnt based on the third currents of the second pixel rows. The burnt determiner 640 may compare the sum of the third currents of the second pixel rows with the product of the second threshold value and M to determine whether the first pixel rows are burnt in an operation S360.

When the sum of the third currents of the second pixel rows is equal to or greater than the product of the second threshold and M, the burnt determiner 640 may determine that at least one of the first pixel rows is burnt. Accordingly, when the sum of the third currents of the second pixel rows is equal to or greater than the product of the second threshold value and M, the burnt determiner 640 may shut down the power supply 400 to minimize a damage of the display device 10 due to at least one the first pixel rows being burnt in an operation S370.

When the sum of the third currents of the second pixel rows is less than the product of the second threshold and M, the burnt determiner 640 may determine that the first pixel rows are not burnt. Accordingly, the sensing controller 630 may sense currents of predetermined pixel rows in a vertical blank period of a frame period after the third frame period FRM3 in the operation S380.

Figure 13:
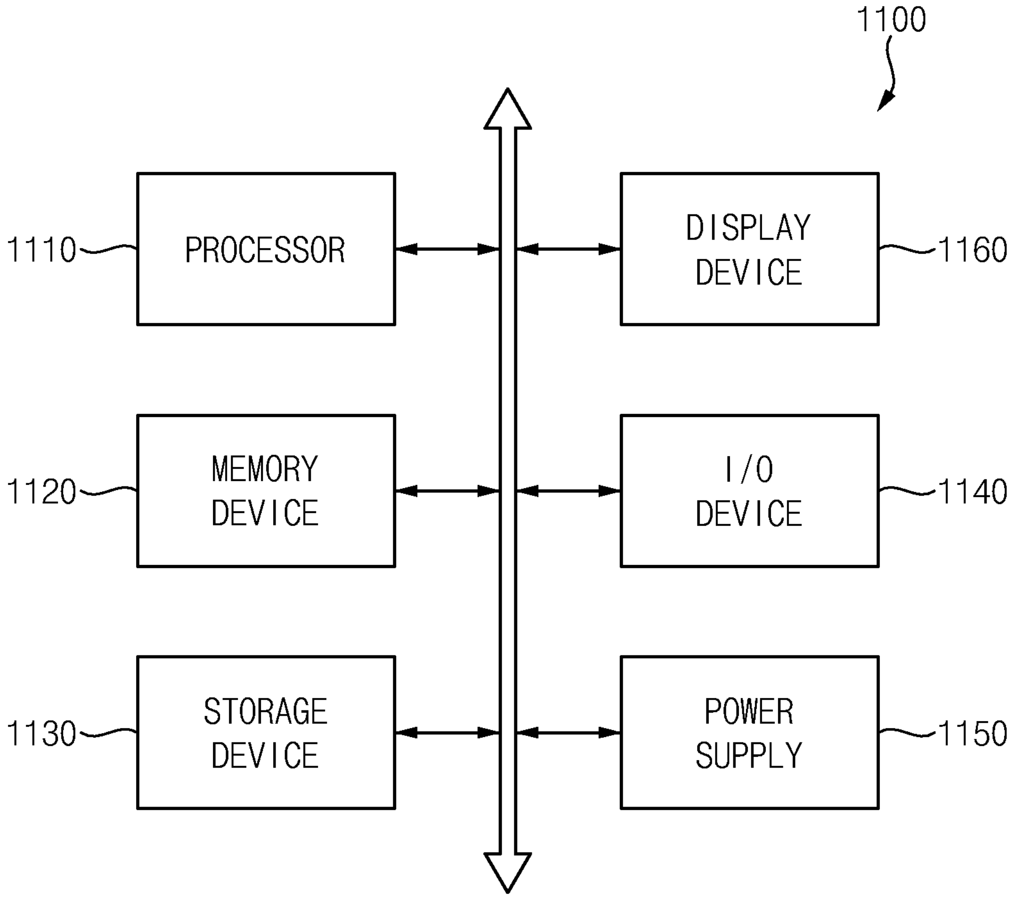
FIG. 13 is a block diagram illustrating an electronic apparatus including a display device according to an embodiment.

FIG. 13 is a block diagram illustrating an electronic apparatus including a display device according to an embodiment.

Referring to FIG. 13, the electronic apparatus 1100 may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like.

In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may supply a power required for the operation of the electronic apparatus 1100. The display device 1160 may be coupled to other components via the buses or other communication links.

In the display device 1160, a current may be sensed for each pixel row in vertical blank periods of frame periods, so that whether the pixel row is burnt may be quickly determined. Further, when the current of the pixel row is greater than or equal to a threshold value, currents of the same pixel row and/or adjacent pixel rows may be sensed, so that whether the pixel row is burnt may be accurately determined.

The display device according to the embodiments may be applied to a display device included in a computer, a notebook, a mobile phone, a smartphone, a smart pad, a PMP, a PDA, an MP3 player, or the like.

Although the display devices and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel including a plurality of pixel rows;

a power supply configured to provide a power voltage to the display panel; and an overcurrent protector configured to shutdown the power supply when at least one of the pixel rows is burnt, the overcurrent protector including:

a sensing controller configured to sense a first current of at least one first pixel row of the display panel in a first frame period, and configured to sense a second current of the first pixel row in a second frame period after the first frame period when the first current is greater than or equal to a first threshold value; and a burnt determiner configured to determine whether the first pixel row is burnt, and configured to provide a shutdown signal to the power supply when the first pixel row is burnt, wherein the sensing controller is configured to sense a third current of at least one second pixel row of the display panel adjacent to the first pixel row in a third frame period after the second frame period when the second current is greater than or equal to the first threshold value, and wherein the burnt determiner is configured to determine that the first pixel row is burnt when the third current is greater than or equal to a second threshold value.

2. The display device of claim 1, wherein the burnt determiner is configured to determine that the first pixel row is burnt when the second current is greater than or equal to the first threshold value.

3. The display device of claim 2, wherein the sensing controller is configured to sense a current of at least one predetermined pixel row of the display panel in a third frame period after the second frame period when the second current is less than the first threshold value.

4. The display device of claim 1, wherein, when the first pixel row is an $N^{th}$ pixel row, where N is a natural number, the second pixel row is at least one of an $(N-1)^{th}$ pixel row, an $(N+1)^{th}$ pixel row, an $(N-2)^{th}$h pixel row, and an $(N+2)^{th}$ pixel row.

5. The display device of claim 1, wherein the second threshold value is equal to the first threshold value.

6. The display device of claim 1, wherein the second threshold value is less than the first threshold value.

7. The display device of claim 1, wherein the sensing controller is configured to sense a current of at least one predetermined pixel row of the display panel in a fourth frame period after the third frame period when the third current is less than the second threshold value.

8. The display device of claim 1, wherein the overcurrent protector further includes:

a frame counter configured to generate a frame period number based on input image data; and a look-up table configured to store a pixel row number for a pixel row to be sensed corresponding to the frame period number.

9. The display device of claim 8, wherein the sensing controller is configured to sense a current of the pixel row based on the pixel row number, and wherein the burnt determiner is configured to compare the current with a threshold value, and update the pixel row number of the look-up table when the current is greater than or equal to the threshold value.

10. A display device, comprising:

a display panel including a plurality of pixel rows;

a power supply configured to provide a power voltage to the display panel;

an overcurrent protector configured to shutdown the power supply when at least one of the pixel rows is burnt, the overcurrent protector including:

a sensing controller configured to sense a first current of at least one first pixel row of the display panel in a first frame period, and configured to sense a second current of the first pixel row in a second frame period after the first frame period when the first current is greater than or equal to a first threshold value;

a burnt determiner configured to determine whether the first pixel row is burnt, and configured to provide a shutdown signal to the power supply when the first pixel row is burnt;

a frame counter configured to generate a frame period number based on input image data; and a look-up table configured to store a pixel row number for a pixel row to be sensed corresponding to the frame period number, wherein the sensing controller is configured to sense a current of the pixel row based on the pixel row number, and wherein the burnt determiner is configured to compare the current with a threshold value, and update the pixel row number of the look-up table when the current is greater than or equal to the threshold value; and a scan driver configured to provide a scan signal to the display panel, wherein the sensing controller is configured to generate a scan start signal provided to the scan driver based on the pixel row number.

11. The display device of claim 1, wherein the burnt determiner is a micro controller unit.

12. A method of driving a display device, the method comprising:

sensing a first current of at least one first pixel row of a display panel in a first frame period;

sensing a second current of the first pixel row in a second frame period after the first frame period when the first current is greater than or equal to a first threshold value;

determining whether the first pixel row is burnt;

stopping a supply of a power voltage to the display panel when the first pixel row is burnt;

sensing a third current of at least one second pixel row of the display panel adjacent to the first pixel row in a third frame period after the second frame period when the second current is greater than or equal to the first threshold value, and wherein determining whether the first pixel row is burnt includes determining that the first pixel row is burnt when the third current is greater than a second threshold value.

13. The method of claim 12, wherein determining whether the first pixel row is burnt includes determining that the first pixel row is burnt when the second current is greater than the first threshold value.

14. The method of claim 13, further comprising:

sensing a current of at least one predetermined pixel row of the display panel in a third frame period after the second frame period when the second current is less than the first threshold value.

15. The method of claim 12, wherein, when the first pixel row is an $N^{th}$ pixel row, where N is a natural number, the second pixel row is at least one of an $(N-1)^{th}$ pixel row, an $(N+1)^{th}$ pixel row, an $(N-2)^{th}$ pixel row, and an $(N+2)^{th}$ pixel row.

16. The method of claim 12, wherein the second threshold value is equal to the first threshold value.

17. The method of claim 12, wherein the second threshold value is less than the first threshold value.

18. The method of claim 12, further comprising:

sensing a current of at least one predetermined pixel row of the display panel in a fourth frame period after the third frame period when the third current is less than the second threshold value.

* * * * *